No. 667,198. Patented Feb. 5, 1901.
C. F. DICKINSON.
MANUFACTURE OF STRUCTURAL BEAMS.
(Application filed Feb. 24, 1900.)

(No Model.)

Witnesses
L. S. Dondero
Chas. S. Hyer.

C. F. Dickinson, Inventor
By his Attorneys.
C. A. Snow & Co.

THE NORRIS PETERS CO., PHOTO-LITHO., WASHINGTON, D. C.

UNITED STATES PATENT OFFICE.

CHARLES F. DICKINSON, OF WHEELING, WEST VIRGINIA.

MANUFACTURE OF STRUCTURAL BEAMS.

SPECIFICATION forming part of Letters Patent No. 667,198, dated February 5, 1901.

Application filed February 24, 1900. Serial No. 6,391. (No specimens.)

*To all whom it may concern:*

Be it known that I, CHARLES F. DICKINSON, a citizen of the United States, residing at Wheeling, in the county of Ohio and State of West Virginia, have invented a new and useful Method for Treating Railroad-Rails, &c., of which the following is a specification.

This invention relates to a method of making various forms of ironwork members or beams out of iron and steel railroad or car rails whether the latter be new, discarded, or second-hand or scrap rails, or what is commonly known as "seconds" in rail-mills; and the object of the same is to cheaply and economically produce various forms of beams by a simple and effective operation and preserve and protect the original flange of the rails at the time the several rails are treated and when joined to construct different forms of beams by utilizing a welding heat and a pressure or blow, and, furthermore, to avoid all rolling, molding, and mechanical coupling operations and devices, as well as dispense with the use of steel billets, pig-iron, or other primary new material or stock, as in ordinary manufactures of ironwork beams or members.

The invention consists in the several steps which will be more fully hereinafter described and claimed.

Figure 1:
Figure 2:
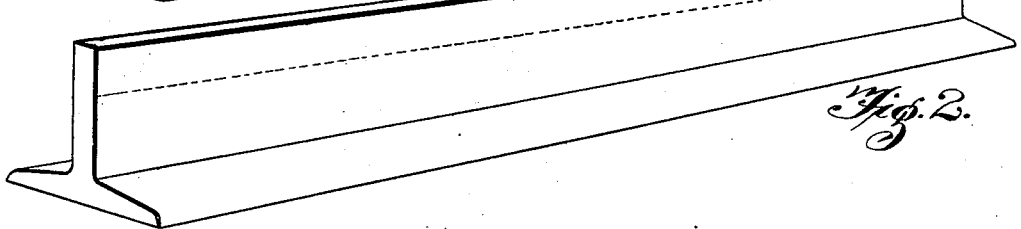
Figure 3:
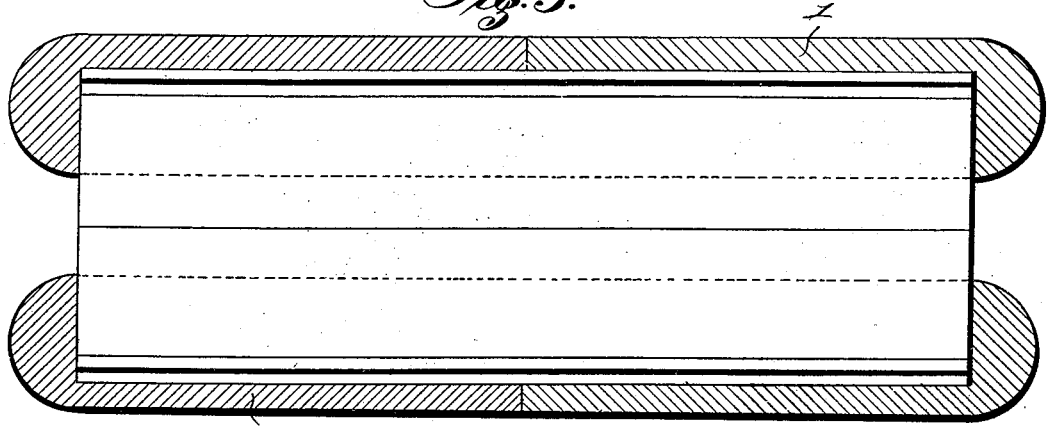
Figure 4:
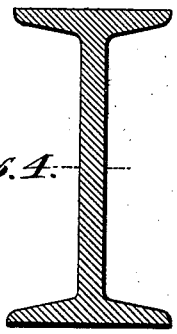
Figure 5:
Figure 6:
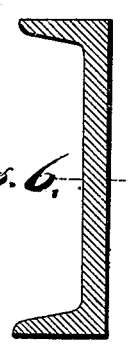

In the drawings, Figure 1 is a perspective view of a railroad-rail. Fig. 2 is a similar view of a rail as it appears after the tread projections or balls have been removed by one step of the improvement and forming a T-beam. Fig. 3 is a sectional view showing the manner of protecting the rail-flange during the heating operation previous to welding two rail-sections together and of holding the rail-sections in positive shape during the welding step to produce another form of beam. Fig. 4 is a detail sectional view of an I-beam formed by my improved method. Fig. 5 is a detail sectional view of a Z-beam formed by my improved method. Fig. 6 is a detail sectional view of a channel-iron made from the prepared rail, as shown by Fig. 2.

The first step of the method is to remove the lateral projections or balls of the tread portion of the rail without the use of heat or the operation of a rolling mechanism, and to accomplish this the rail of whatever character to be treated is placed in a metal-planing machine subjected to the action of a cold saw or any other apparatus that has a cutting operation analogous to that set forth. In removing the lateral projections or balls of the tread the ordinary web of a railroad-rail is increased in width by cutting off the parts stated inwardly to the plane of the opposite faces of the web, and thereby obtain the additional extension provided by the usual vertical thickness of the tread portion of a rail. In the use of railroad-rails for forming ironwork members or beams as heretofore practiced it has been common to work the rail through a rolling-mill and generally reorganize its structure and in some instances to entirely cut off the tread portion of the rail, and thereby lose the extension of what afterward becomes the stem of the beam. In other operations mechanical coupling devices have been directly riveted or bolted over the abutting tread portions of rail-sections; but this has produced a highly inefficient article in view of the fact that the two tread-surfaces would form a movable bearing and soon work the rivets or bolts loose and render the beam or member so constructed of very little value from a practical standpoint. It will be observed that in removing the lateral tread projections or balls of the rails while cold and in accordance with my method the metal of the rail is not in the least changed or weakened and a material saving in material results by utilizing the extra metal between the lateral tread projections or balls. Moreover, the portions that are cut off can be disposed of by the manufacturer with profit, and the first cost of the rails used in forming the beams will be essentially reduced. The beam resulting from the removal of the lateral tread projections or balls of the rail can be used alone for many purposes without any further treatment, or the flanges of two of the rails thus prepared can be placed back to back and securely bolted or otherwise fastened, and thus produce another combination and a different form of beam or support. Furthermore, a plurality of the beams thus prepared can have their flanges or the original rail-flange disposed at an angle to each other and the edges joined to thus produce an effective column, and these combinations could be carried on indefinitely, as will be obviously apparent.

Though the rail as prepared and shown by Fig. 2 may be used alone, as indicated, the progressive steps of the method contemplate the production of a more serviceable and desirable combination, and after the rail has been subjected to the cold-cutting operation to remove the tread projections or balls the rail-sections are then inclosed within suitable metallic casings 1, which are case-hardened and made in sections, so that they can be easily applied or withdrawn or disconnected from the stock being operated upon. In arranging the prepared rails in these casings the original rail-flanges are fully inclosed and completely protected and the extended web or stem is left projecting a suitable distance from one side of each casing. Two of these casings are applied over as many prepared rails which are to be joined, and after being firmly clamped or locked the said casings carrying the prepared rails are inserted in a furnace and subjected to a high heat or of a degree sufficient to permit a practical welding operation to be pursued. It will be seen that the flange of each prepared rail will be prevented from burning off or losing its shape by reason of the inclosure within the casing, and, moreover, the said prepared section will be retained in its shape and prevented from buckling or twisting by the action of the heat. The casing will have its exterior portion intensely heated, and this heat will extend partially into the body of the casing, but will not be of sufficient degree at the core or adjacent the inclosed portion of the prepared rail to have any injurious effect on the latter whatever. After the projecting portions of the webs or stems have been heated sufficiently the two casings are withdrawn from the furnace and the edges or exposed ends of the said webs or stems are brought to bear against each other and so held during the third step of welding, which may be carried on by any of the well-known processes and in any preferred manner. During the welding operation the rail-sections in the casings will still have their shape preserved, and after a practical jointure has been effected the casings are removed and the resultant product will be what is known as an "I-beam." From this latter product a number of other different beams may be made, and by cutting off one-half of the flange at top and bottom on opposite sides the Z-beam (illustrated by Fig. 5) is made, or by cutting off the upper and lower flanges on the same side the channel-iron (shown by Fig. 6) will result, and it is obvious that by placing two of the channel-irons together and bolting the same a very strong and durable compound girder or upright can be produced.

It is well known that a welded device will invariably first fracture or break at any other point than the line of weld or jointure, and by uniting two of the prepared rail-sections in the manner set forth an exceptionally strong ironwork member or beam will be produced, and in addition care will be taken in all the steps of the method to avoid detracting in the least from the desirable properties and characteristics as to strength and durability of railroad-rails and which arises from their original manufacture. Hence the tread projections or balls are removed by cold-cutting, and in heating the sections to join them the degree of heat employed will be that necessary for welding only, and therefore the hardness of the metal will not in the least be affected. In carrying out the steps of the method it is proposed to use any desired apparatus or machinery best adapted for the purpose, and the casings for holding the prepared rail-sections during the heating step may be varied indefinitely.

It will be understood that the beams will vary in size and weight proportionately to the size and weight of the rails from which they are formed, and forms of beams or members other than those mentioned may be produced at will without departing from the several steps disclosed. The cheapness of the character of the railroad-rails used in forming the beams and the simplicity and inexpensive character of the method pursued will materially reduce the cost of manufacture of ironwork members or beams. Moreover, the simplicity of the method will result in a quick production, and as the quantity of railroad-rails of the character set forth is almost inexhaustible the manufacturer employing the foregoing method will not be confronted with the serious difficulty incident to a scarcity of material or stock.

Having thus described the invention, what is claimed as new is—

1. The method of forming ironwork members or beams consisting in longitudinally removing the lateral portions or projections of the treads or heads of railroad-rails to the plane of the opposite sides of the web by a cold-cutting operation without preliminary heating of the rails to increase the width of the web to normal depth of said treads or heads, inclosing portions of the rails so prepared to preserve their shape and subjecting them to a welding heat, and welding the exposed heated portions.

2. The method of forming ironwork members or beams consisting in longitudinally removing the lateral portions or projections of the treads or heads of railroad-rails to the plane of the opposite sides of the web by a cold-cutting operation without preliminary heating of the rails to increase the width of the web to the normal depth of said treads or heads, inclosing the flanges and portions of the webs of the rails so prepared to preserve their shape and subjecting the exposed portions of the webs to a welding heat, and directly joining the exposed edges of the webs of the heated rail-sections while still inclosed in part and welding the said edges.

3. The method of forming ironwork members or beams from railroad-rails consisting in longitudinally removing the lateral portions or projections of the treads or heads of the same to the plane of the opposite sides of the web by a cold-cutting operation without preliminary heating of the rails to increase the width of the web to the normal depth of said treads or heads, removing one of the flanges by a cold-cutting operation, inclosing portions of two distinct rail-sections so prepared to preserve their shape and subjecting them to a welding heat, and directly contacting and welding the heated edge portions of the webs.

In testimony that I claim the foregoing as my own I have hereto affixed my signature in the presence of two witnesses.

CHARLES F. DICKINSON.

Witnesses:
CHAS. S. HYER,
M. PERRY HAHN.